US012798598B2

(12) United States Patent
Liu et al.

(10) Patent No.: US 12,798,598 B2
(45) Date of Patent: Nov. 17, 2026

(54) METHOD AND APPARATUS FOR CONTROLLING VEHICLE-RIDING SAFETY, ELECTRONIC DEVICE AND PRODUCT

(71) Applicant: GREAT WALL MOTOR COMPANY LIMITED, Baoding (CN)

(72) Inventors: Lijuan Liu, Baoding (CN); Jing Liu, Baoding (CN); Yan Wang, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 99 days.

(21) Appl. No.: 18/711,655

(22) PCT Filed: Nov. 16, 2022

(86) PCT No.: PCT/CN2022/132206

§ 371 (c)(1),
(2) Date: May 20, 2024

(87) PCT Pub. No.: WO2023/093586

PCT Pub. Date: Jun. 1, 2023

(65) Prior Publication Data

US 2025/0010875 A1 Jan. 9, 2025

(30) Foreign Application Priority Data

Nov. 26, 2021 (CN) ........................ 202111425839.6

(51) Int. Cl.
*B60W 50/14* (2020.01)
*B60W 50/00* (2006.01)
(Continued)

(52) U.S. Cl.
CPC ........ *B60W 50/14* (2013.01); *B60W 50/0097* (2013.01); *G06V 20/59* (2022.01);
(Continued)

(58) Field of Classification Search
CPC ...... B60W 40/00; B60W 40/08; B60W 40/09; B60W 50/00; B60W 50/0097;
(Continued)

(56) References Cited

U.S. PATENT DOCUMENTS 11,040,695 B2 6/2021 Galan-Oliveras et al.
11,321,951 B1 * 5/2022 Chan .................... B60W 50/14
(Continued)

FOREIGN PATENT DOCUMENTS

CN 206031279 U 3/2017
CN 106985750 A 7/2017
(Continued)

OTHER PUBLICATIONS

Al, Yuba, New High-tech System: Predictable Wrong Driving Actions (Bilingual), 2015, Retrieved from: https://edu.sina.com.cn/en/2015-04-23/093489201.shtml.
(Continued)

*Primary Examiner* — Van T Trieu
(74) *Attorney, Agent, or Firm* — Bayramoglu Law Offices LLC

(57) ABSTRACT

A method and apparatus for controlling vehicle-riding safety, an electronic device and a product are provided. The method includes: firstly determining, from the objects that ride in a vehicle, a target object that is required to be monitored; obtaining an action trajectory of the target object; based on the movement trajectory of the target object, predicting a target action of the target object at a future moment; and based on the target action performed by the target object at the future moment and the vehicle state, further determining the dangerous situation of the target object, and executing a control strategy corresponding to the dangerous situation. In other words, when it is predicted that a danger happens at a future time, then the control strategy
(Continued)

is executed, thereby the object of early warning is realized, and a danger is prevented from happening.

17 Claims, 5 Drawing Sheets

(51) Int. Cl.

| | |
|---|---|
| ***G06V 20/59*** | (2022.01) |
| ***G06V 40/16*** | (2022.01) |
| ***G06V 40/20*** | (2022.01) |
| ***G10L 15/26*** | (2006.01) |

(52) U.S. Cl.
CPC ............ *G06V 40/178* (2022.01); *G06V 40/23* (2022.01); *G10L 15/26* (2013.01); *B60W 2420/403* (2013.01); *B60W 2540/21* (2020.02); *B60W 2540/223* (2020.02); *B60W 2540/227* (2020.02); *G06V 2201/07* (2022.01)

(58) Field of Classification Search
CPC ...... B60W 50/08; B60W 50/11; B60W 50/14; B60W 60/00; G06V 20/56; G06V 20/59; G06V 20/597; G06V 40/20; E05B 85/00; E05B 79/20
See application file for complete search history.

(56) References Cited

U.S. PATENT DOCUMENTS

| | | | | |
|---|---|---|---|---|
| 2017/0308909 | A1* | 10/2017 | Faith | G06Q 30/0201 |
| 2018/0179790 | A1* | 6/2018 | Jeong | E05B 81/25 |
| 2020/0103980 | A1 | 4/2020 | Katz et al. | |
| 2021/0009150 | A1 | 1/2021 | Chen et al. | |
| 2022/0144140 | A1* | 5/2022 | Kondrad | B60N 2/0248 |
| 2023/0347903 | A1* | 11/2023 | Katz | G06V 20/597 |

FOREIGN PATENT DOCUMENTS

| | | | |
|---|---|---|---|
| CN | 110509872 | A | 11/2019 |
| CN | 111267728 | A | 6/2020 |
| CN | 111460978 | A | 7/2020 |
| CN | 115035498 | A | 9/2022 |
| JP | 2021115975 | A | 8/2021 |
| KR | 20210019646 | A | 2/2021 |

OTHER PUBLICATIONS

The Second Office Action for CN Application No. 202111425839.6, China National Intellectual Property Administration, issued on Jun. 9, 2025, pp. 1-10.

Qing Lei, et al., A Survey of Vision-Based Human Action Evaluation Methods, Sensors, 2019, pp. 1-27, vol. 19.

European Search Report for Application No. 22897669.2, European Patent Office, issued on Jan. 3, 2025 , pp. 1-8.

* cited by examiner

METHOD AND APPARATUS FOR CONTROLLING VEHICLE-RIDING SAFETY, ELECTRONIC DEVICE AND PRODUCT

CROSS REFERENCE TO THE RELATED APPLICATIONS

This application is the national phase entry of International Application No. PCT/CN2022/132206, filed on Nov. 16, 2022, which is based upon and claims priority to Chinese Patent Application No. 202111425839.6, filed on Nov. 26, 2021, the entire contents of which are incorporated herein by reference.

TECHNICAL FIELD

The present application relates to the field of vehicle-riding safety and, more particularly, to a method and apparatus for controlling vehicle-riding safety, an electronic device and a product.

BACKGROUND

The occupancy monitoring system (OMS) is an extension of the driver monitor system (DMS), and can detect whether the passengers that ride in a vehicle (especially the children) have a danger. When a danger happens, the OMS alarms.

All of the current OMS systems alarm when a danger has already happened, and cannot prevent a danger from happening.

SUMMARY

In view of the above, a method and apparatus for controlling vehicle-riding safety, an electronic device and a product are provided by the present application to solve the problem that all of the current OMS systems alarm when a danger has already happened, and cannot prevent a danger from happening.

In order to achieve the above object, the present application provides the following technical solutions.

According to a first aspect of the embodiments of the present application, a method for controlling vehicle-riding safety is provided, wherein the method includes:

determining a target object from objects that ride in a vehicle;

obtaining an action trajectory of the target object;

based on the action trajectory, predicting a target action of the target object at a future moment;

based on the target action and a vehicle state of the vehicle, determining a dangerous situation of the target object at the future moment; and executing a control strategy corresponding to the dangerous situation, wherein the control strategy includes at least a prompting message, and the prompting message is for prompting other objects than the target object that ride in the vehicle that the target object is about to be in danger.

According to a second aspect of the embodiments of the present application, an apparatus for controlling vehicle-riding safety is provided, wherein the apparatus includes:

a first determining module configured for determining a target object from objects that ride in a vehicle;

a first obtaining module configured for obtaining an action trajectory of the target object;

a predicting module configured for, based on the action trajectory, predicting a target action of the target object at a future moment;

a second determining module configured for, based on the target action and a vehicle state of the vehicle, determining a dangerous situation of the target object at the future moment; and an executing module configured for executing a control strategy corresponding to the dangerous situation, wherein the control strategy includes at least a prompting message, and the prompting message is for prompting other objects than the target object that ride in the vehicle that the target object is about to be in danger.

According to a third aspect of the embodiments of the present application, an electronic device is provided, wherein the electronic device includes:

a processor; and a memory configured to store an instruction executable by the processor; and the processor is configured to execute the instruction to implement the method for controlling the vehicle-riding safety according to the first aspect.

According to a fourth aspect of the embodiments of the present application, a computer-readable storage medium is provided, wherein when an instruction in the storage medium is executed by a processor of an electronic device, the electronic device is enabled to be capable of implementing the method for controlling the vehicle-riding safety according to the first aspect.

According to a fifth aspect of the embodiments of the present application, a computer program product is provided, including a computer program/instruction, wherein the computer program/instruction, when executed by a processor, implements the method for controlling the vehicle-riding safety according to the first aspect.

It can be known from the above technical solutions that the method for controlling the vehicle-riding safety according to the present application includes firstly determining, from the objects that ride in the vehicle, the target object that is required to be monitored; obtaining the action trajectory of the target object; based on the movement trajectory of the target object, predicting the target action of the target object at a future moment; and based on the target action performed by the target object at the future moment and the vehicle state, further determining the dangerous situation of the target object, and executing a control strategy corresponding to the dangerous situation. In other words, when it is predicted that a danger happens at a future time, then the control strategy is executed, thereby the object of early warning is realized, and a danger is prevented from happening.

BRIEF DESCRIPTION OF THE DRAWINGS

In order to more clearly illustrate the technical solutions of the embodiments of the present application or the prior art, the drawings that are required to describe the embodiments or the prior art will be briefly described below. Apparently, the drawings that are described below are merely embodiments of the present application, and a person skilled in the art can obtain other drawings according to the provided drawings without paying creative work.

DETAILED DESCRIPTION OF THE EMBODIMENTS

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

A method and apparatus for controlling vehicle-riding safety, an electronic device and a product are provided by the embodiments of the present application. Before the technical solutions of the embodiments of the present application are described, the hardware architecture involved in the embodiments of the present application will be described firstly.

Figure 1:
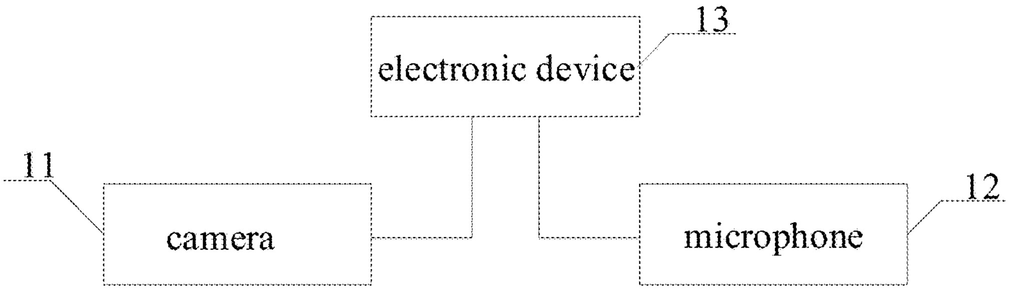
FIG. 1 is a schematic diagram of a hardware architecture involved in an embodiment of the present application.

As shown in FIG. 1, FIG. 1 is a schematic diagram of a hardware architecture involved in an embodiment of the present application. The hardware architecture includes a camera 11, a microphone 12 and an electronic device 13.

It can be understood that the camera 11, the microphone 12 and the electronic device 13 are disposed in a vehicle.

As an example, one or more cameras 13 may be disposed in the vehicle. As an example, one or more microphones 12 may be disposed in the vehicle.

As an example, the camera 11 may be a 3D camera or a 2D camera.

As an example, the electronic device 13 may include a memory and a processor.

As an example, the electronic device 13 is connected to the camera 11 and the microphone 12, and the electronic device 13 may obtain the video and/or image collected by the camera 11, and obtain the voice information collected by the microphone 12.

As an example, the electronic device 13 may analyze the video and/or image collected by the camera 11.

As an example, the electronic device 13 may analyze the voice information collected by the microphone 12.

As an example, the electronic device 13 may send the video and/or image collected by the camera 11 to a server, to cause the server to analyze the video and/or image collected by the camera 11, and receive the analysis result returned by the server.

As an example, the electronic device 13 may send the voice information collected by the microphone 12 to a server, to cause the server to analyze the voice information collected by the microphone 12, and receive the analysis result returned by the server.

In an optional embodiment, the hardware architecture may further include a radar sensor, and the radar sensor may be disposed in the vehicle.

As an example, the radar sensor may be arranged at the positions such as the car door and the seat.

In an optional embodiment, the hardware architecture may further include a temperature sensor.

It should be noted that a person skilled in the art can understand that the structure of the hardware architecture shown in FIG. 1 does not limit the hardware architecture, and the hardware architecture may include components more or fewer than those shown in FIG. 1 or a combination of some of the components, or has a different arrangement of the components.

The method for controlling the vehicle-riding safety according to the embodiments of the present application will be described below with reference to the above-described hardware architecture.

Figure 2:
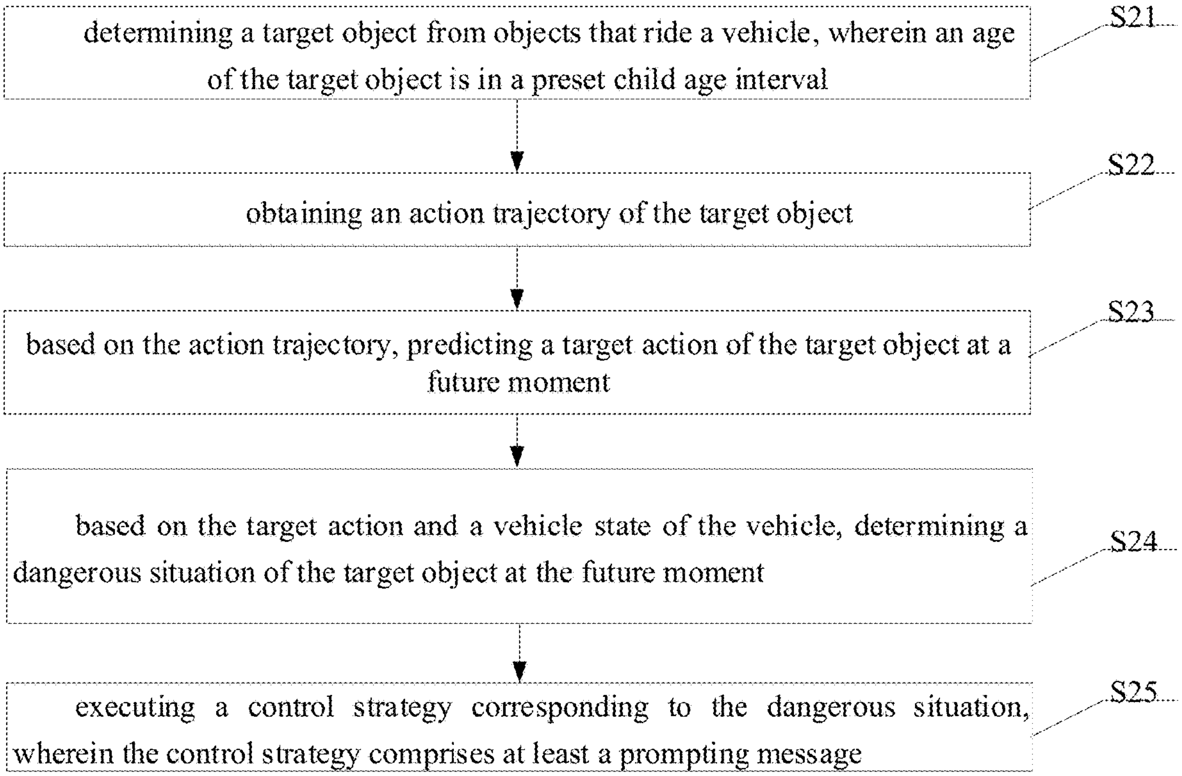
FIG. 2 is a flow chart of a method for controlling vehicle-riding safety according to an embodiment of the present application.

As shown in FIG. 2, FIG. 2 is a flow chart of a method for controlling vehicle-riding safety according to an embodiment of the present application. The method may be applied to the above-described electronic device 13. The method, in the implementing process, may include the following steps S21 to S25.

Step S21: determining a target object from objects that ride in a vehicle.

In an optional embodiment, the age of the target object is in a preset age interval.

As an example, the preset age interval is from 0 year to 12 years.

As an example, the preset age interval may be any one of (0 year, 1 year], (1 year, 4 years], (4 years, 7 years] and (7 years, 12 years].

In an optional embodiment, when the target object is determined based on the age, then the step S21 has various implementations, and the embodiments of the present application provide, without limitation, the following three implementations.

In the first implementation of the step S21, the user, before riding in the vehicle, inputs in advance the ages of the objects sitting in the seats by using an inputting device in the vehicle, thus it can be determined which seat the target object is sitting in.

The second implementation of the step S21 includes the following steps A11 to A13.

Step A11: collecting human-face images of the objects that ride in the vehicle.

Step A12: inputting the human-face images of the objects into an age identifying model that is pre-constructed, to obtain the ages corresponding to the objects outputted by the age identifying model.

As an example, a machine-learning model may be trained by using human-face images of sample users as sample human-face images and using actual ages of the sample users as the training target, to obtain the age identifying model.

As an example, the process of training the age identifying model involves at least one of the techniques in machine learning such as artificial neural network, belief network, reinforcement learning, transfer learning, inductive learning and style teaching learning.

As an example, the age identifying model may be any one of a neural network model, a logistic regression model, a linear regression model, Support Vector Machine (SVM), Adaboost, XGboost and the Transformer-Encoder model.

As an example, the age identifying model may be any one of a model based on recurrent neural network, a model based on convolutional neural network and a classification model based on Transformer-encoder.

Step A13: based on the ages corresponding to the objects, from the objects, determining the target object whose age is in the preset age interval.

The third implementation of the step S21 includes the following steps A21 to A27, wherein the following steps A21 to A26 are executed to each of the objects.

Step A21: collecting in real time a video containing the objects by using a 3D camera.

Step A22: obtaining a plurality of frame images contained in the video.

Step A23: establishing a plane coordinate system in each of the plurality of frame images.

As an example, the process of establishing a plane coordinate system in each of the images includes: identifying a position of a nasal tip of the object in the image; and setting the position of the nasal tip to be the origin of the coordinate system, and setting the nasal bridge line to be the y-axis, to establish the coordinate system.

Step A24: tracking and locating the human face of the object in the plurality of frame images, extracting the human-face features of the object and placing into the plane coordinate system, to obtain an optimum human-face image from the plurality of frame images.

As an example, the optimum human-face image is a direct image of the face in which the two eyes completely fall within the plane coordinate system and the pixels are clear.

Step A25: extracting the human-face features of the optimum human-face image.

As an example, extracting the human-face features specifically includes: extracting position numerical values in the plane coordinate system of the eyebrows, the eyes, the ears, the nose and the mouth; extracting quantity numerical values in the plane coordinate system of the eyebrows, the eyes, the ears, the nose and the mouth; extracting the position numerical values in the plane coordinate system of the human-face contour; and extracting the skin-color numerical value of the human face.

Step A26: based on the human-face features, determining the age of the object.

Step A27: based on the ages of the objects that ride in the vehicle, from the objects, determining the target object whose age is in the preset age interval.

In an optional embodiment, the target object is a person having mental retardation.

In an optional embodiment, when the target object is determined based on whether he has mental retardation, then the step S21 has various implementations, and the embodiments of the present application provide, without limitation, the following implementations.

The user, before riding in the vehicle, inputs in advance the intelligence situations of the objects sitting in the seats by using an inputting device in the vehicle, thus it can be determined which seat the target object is sitting in.

In an optional embodiment, the target object is a disabled person having difficulty in moving.

In an optional embodiment, when the target object is determined based on whether he has difficulty in moving, then the step S21 has various implementations, and the embodiments of the present application provide, without limitation, the following implementation.

The user, before riding in the vehicle, inputs in advance the situations of body disability of the objects sitting in the seats by using an inputting device in the vehicle, thus it can be determined which seat the target object is sitting in.

Step S22: obtaining an action trajectory of the target object.

In an optional embodiment, the step S22 has various implementations, and the embodiments of the present application provide, without limitation, the following two implementations.

The first implementation of the step S22 includes the following steps B11 to B14.

Step B11: obtaining a video containing the target object.

Step B12: obtaining the each frame image contained in the video.

Step B13: obtaining human-body gestures of the target object in each frame image contained in the video, wherein each of the human-body gestures is formed by a plurality of articulation points.

As an example, the articulation points of the target object in the images may be extracted by using an articulation-point predicting model that is pre-constructed.

As an example, the articulation-point predicting model may be any one of a neural network model, a logistic regression model, a linear regression model, Support Vector Machine (SVM), Adaboost, XGboost and the Transformer-Encoder model.

The process of extracting the articulation points of the target object in the images based on the articulation-point predicting model will be described below.

Figure 3:
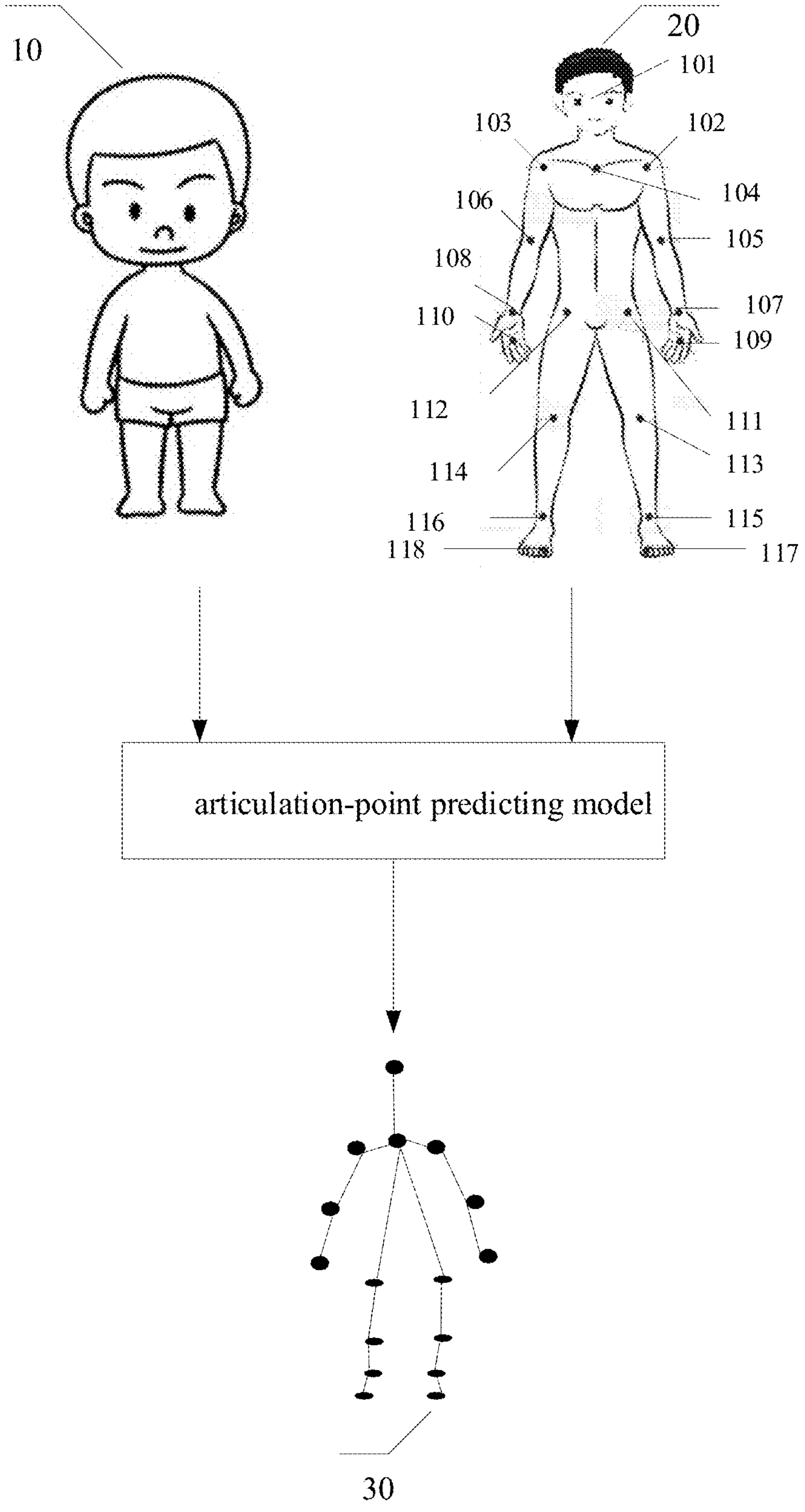
FIG. 3 is a schematic diagram of a process of extracting the articulation points of the target object in the images by an articulation-point predicting model according to an embodiment of the present application.

As shown in FIG. 3, FIG. 3 is a schematic diagram of a process of extracting the articulation points of the target object in the images by an articulation-point predicting model according to an embodiment of the present application.

As an example, as shown in FIG. 3, a human-body architecture image 20 includes, without limitation, 18 articulation points, which are a head articulation point 101, a left-shoulder articulation point 102, a right-shoulder articulation point 103, a neck articulation point 104, a left-elbow articulation point 105, a right-elbow articulation point 106, a left-wrist articulation point 107, a right-wrist articulation point 108, a left-palm articulation point 109, a right-palm articulation point 110, a left-hip articulation point 111, a right-hip articulation point 112, a left-knee articulation point 113, a right-knee articulation point 114, a left-ankle articulation point 115, a right-ankle articulation point 116, a left-tiptoe articulation point 117, and a right-tiptoe articulation point 118.

In practical applications, the quantity of the articulation points contained in the human-body architecture image 20 may be less than 18. For example, the human-body architecture image may include merely 14 articulation points of the head articulation point 101, the left-shoulder articulation point 102, the right-shoulder articulation point 103, the neck articulation point 104, the left-elbow articulation point 105, the right-elbow articulation point 106, the left-wrist articulation point 107, the right-wrist articulation point 108, the left-hip articulation point 111, the right-hip articulation point 112, the left-knee articulation point 113, the right-knee articulation point 114, the left-ankle articulation point 115 and the right-ankle articulation point 116.

In practical applications, the quantity of the articulation points contained in the human-body architecture image 20 may be greater than 18. For example, the human-body architecture image may further include a nasal-tip articulation point, a left-ear articulation point, a right-ear articulation point, a left-eye articulation point, a right-eye articulation point and so on.

Regarding each of the images 10 of the each frame image, the image 10 and the human-body architecture image 20 are inputted into the articulation-point predicting model, so that the articulation-point predicting model extracts the articulation points of the target object in the image. The articulation points are connected to obtain the human-body gesture.

As an example, the articulation-point predicting model may output the human-body gesture of the target object that is formed by predicted positions of the articulation points, for example, the image 30 shown in FIG. 3.

Because all of the architectures of human bodies are the same, the human-body architecture image according to the embodiments of the present application is a comparison standard. In other words, the articulation-point predicting model, when obtains the predicted positions of the articulation points in the image, compares them with the positions of the articulation points in the human-body architecture image, for example, comparing the left-shoulder articulation point in the human-body architecture image with the position region where the target object is located in the image, to determine which position within the position region has the highest possibility of being the predicted position of the left-shoulder articulation point. Because in the embodiments of the present application, the human-body model features of the human-body architecture image are used as the comparison standard, the obtained predicted positions of the articulation points in the image are accurate.

Step B14: based on a variation trend of position information of same articulation points in the human-body gestures corresponding to the each frame image, determining the action trajectory of the target object.

It can be understood that the position information of the same one articulation point in the images may be determined, for example, the position information of the head articulation point in the images, so that the variation trend of the head articulation point can be determined. Because the variation trends of the articulation points can be obtained, the action trajectory can be determined.

It can be understood that the action trajectory obtained in a two-dimensional coordinate system might be inaccurate. In view of that, the embodiments of the present application further provide the second implementation of the step S22.

The second implementation of the step S22 includes the following steps B21 to B27.

In the second implementation of the step S22, it is required to arrange a plurality of cameras in the vehicle, so that different cameras can collect the images of the target object in different directions.

Step B21: obtaining videos containing the target object that are collected by the cameras in the different directions.

The following steps B22 to B23 are executed to each of the videos, to obtain the three-dimensional coordinates in the three-dimensional systems of the target object in the each frame image contained in the video.

Step B22: obtaining a plurality of frame images contained in the video.

Step B23: regarding each of the plurality of frame images, obtaining the two-dimensional coordinate (u,v) in the two-dimensional system of the target object in the image, and converting the two-dimensional coordinate into a three-dimensional coordinate (X,Y,Z).

In an optional embodiment, the formula of the conversion between the two-dimensional coordinate and the three-dimensional coordinate is as follows:

$$S\begin{bmatrix} u \\ v \\ 1 \end{bmatrix} = \begin{bmatrix} f_x & 0 & c_x \\ 0 & f_y & c_y \\ 0 & 0 & 1 \end{bmatrix}\begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}\begin{bmatrix} X \\ Y \\ Z \\ 1 \end{bmatrix}.$$

Given that all of the target objects are on the ground plane, i.e., Z=0, then the above formula may be converted into:

$$\begin{cases} X = w_1 u + w_2 v + b_1 \\ Y = w_3 u + w_4 v + b_2 \end{cases};$$

$$\text{wherein } w_1 = \frac{f_x r_{12}}{f_x r_{12} f_y r_{21} - f_x r_{11} f_y r_{22}};\ w_2 = -\frac{f_y r_{22}}{f_x r_{12} f_y r_{21} - f_x r_{11} f_y r_{22}};$$

$$w_3 = \frac{f_x r_{11}}{f_y r_{22} f_x r_{11} - f_y r_{21} f_x r_{12}};\ w_4 = \frac{f_y r_{21} u}{f_y r_{22} f_x r_{11} - f_y r_{21} f_x r_{12}};$$

$$b_1 = \frac{f_y r_{22} f_x t_1 - f_x r_{12} f_y t_2 + c_x f_y r_{22} - c_y f_x r_{12}}{f_x r_{12} f_y r_{21} - f_x r_{11} f_y r_{22}};$$

$$\text{and } b_2 = \frac{f_y r_{21} f_x t_1 - f_x r_{11} f_y t_2 + c_x f_y r_{21} - c_y f_x r_{11}}{f_y r_{22} f_x r_{11} - f_y r_{21} f_x r_{12}}.$$

Based on that, the coordinate mapping relation between the two-dimensional coordinate ($u_i$, $v_i$) and the three-dimensional coordinate ($X_i$,$Y_i$,$Z_i$) may be established by using the least square method, to finally obtain the following mapping relation:

$$\begin{cases} X_i = w_1 u_i + w_2 v_i + b_1 \\ Y_i = w_3 u_i + w_4 v_i + b_2 \\ Z_i = 0 \end{cases}.$$

Step B24: adding the three-dimensional coordinates of the target object in the images contained in the each video into the three-dimensional system of coordinate.

All of the videos include the images of the same quantity, and the time of the images corresponds. For example, totally three cameras are arranged in different directions, which are a camera 1 (the video collected by the camera 1 is referred to as the video 1), a camera 2 (the video collected by the camera 2 is referred to as the video 2) and a camera 3 (the video collected by the camera 3 is referred to as the video 3). Each of the videos collected by the three cameras includes M frame images, and the collection time of the i-th frame image of the video 1=the collection time of the i-th frame image of the video 2=the collection time of the i-th frame image of the video 3, wherein the value of i is any numerical value from 1 to M.

Step B25: obtaining a plurality of three-dimensional-position sets, wherein each of the three-dimensional-position sets includes the three-dimensional coordinates corresponding to the same collection time.

For example, the three-dimensional-position set i includes the three-dimensional coordinate of the target object in the i-th frame image of the video 1, the three-dimensional coordinate of the target object in the i-th frame image of the video 2 and the three-dimensional coordinate of the target object in the i-th frame image of the video 3.

Step B26: inputting each of the three-dimensional-position sets into a gesture identifying model that is pre-constructed, to obtain the human-body gesture corresponding to the three-dimensional coordinates.

As an example, the gesture identifying model may be any one of a neural network model, a logistic regression model, a linear regression model, Support Vector Machine (SVM), Adaboost, XGboost and the Transformer-Encoder model.

Step B27: regarding any two three-dimensional-position sets whose time is consecutive, connecting the corresponding articulation points in the human-body gestures corresponding to the two three-dimensional-position sets, to obtain the action trajectory in the three-dimensional system.

The time corresponding to the three-dimensional-position set refers to the time of the collection of the images corresponding to the three-dimensional coordinates contained by the three-dimensional-position set.

It can be understood that the corresponding articulation points in the human-body gestures corresponding to the two three-dimensional-position sets refer to the articulation points that have the same name.

The embodiments of the present application can restore the information of the position variation of the target object in the true space, and can realize fusing the information of the target object collected by the plurality of cameras at the same time, to provide more information to high-level behavior analysis on the target object.

Step S23: based on the action trajectory, predicting a target action of the target object at a future moment.

In an optional embodiment, the step S23 has various implementations, and the embodiments of the present application provide, without limitation, the following two implementations.

The first implementation of the step S23 includes the following step C11.

Step C11: inputting the action trajectory into an action predicting model that is pre-constructed, to obtain the target action outputted by the action predicting model.

The action predicting model is obtained by training a machine-learning model by using sample action trajectories as the input and using the result of the marking of the sample target actions corresponding to the sample action trajectories as the output.

It can be understood that different behavior trajectories of children in vehicles may be collected in advance, for example, the behavior trajectory of opening a car window, the behavior trajectory of opening a car door, the behavior trajectory of sliding down from a safety seat, the behavior trajectory of untieing a safety belt, and the behavior trajectory of placing a limb adjacent to a car door.

It can be understood that each of the above-described collected behavior trajectories includes an action trajectory and a target action. The action trajectory refers to the trajectory before the target action happens. In other words, each of the above-described behavior trajectories may be split into the action trajectory and the target action. The target actions may be marked artificially or by machine, to obtain the marking results. For example, the marking results may include a target action of touching and pressing a car-window opening press key, a target action of pulling a car-door handle, a target action of placing a limb into a car-door gap, a target action of untieing a safety belt, and a target action of sliding down from a safety seat.

In the embodiments of the present application, the action trajectories split from the behavior trajectories are referred to as the sample action trajectories, and the marking results of the target actions are the marking results of the sample target actions.

The second implementation of the step S23 includes the following step C21.

Step C21: comparing the action trajectory with predetermined trajectories corresponding to the actions, and determining the action corresponding to the trajectory matched with the action trajectory to be the target action.

It can be understood that, before children perform the target actions, there are certain fixed trajectories. For example, regarding the action of pulling a car-door handle, the trajectories corresponding to it include a trajectory of approaching the car door and a trajectory of stretching a hand to the door handle. The action trajectory may be compared with the predetermined trajectories, and when the action trajectory matches with a target trajectory, then the target action corresponding to the action trajectory is the action corresponding to the target trajectory.

Step S24: based on the target action and a vehicle state of the vehicle, determining a dangerous situation of the target object at the future moment.

Step S25: executing a control strategy corresponding to the dangerous situation, wherein the control strategy includes at least a prompting message, and the prompting message is for prompting other objects than the target object that ride in the vehicle that the target object is about to be in danger.

In an optional embodiment, different dangerous situations correspond to different control strategies.

In an optional embodiment, different dangerous situations correspond to the same control strategy.

As an example, the prompting message may be a voice message or a video message.

The method for controlling the vehicle-riding safety according to the embodiments of the present application includes firstly determining, from the objects that ride in the vehicle, the target object that is required to be monitored; obtaining the action trajectory of the target object; and based on the movement trajectory of the target object, predicting the target action of the target object at a future moment; and based on the target action and the vehicle state, further determining the dangerous situation of the target object, and executing a control strategy corresponding to the dangerous situation. In other words, when it is predicted that a danger happens at a future time, then the control strategy is executed, thereby the object of early warning is realized, and a danger is prevented from happening.

In an optional embodiment, the step S24 has various implementations, and the embodiments of the present application provide, without limitation, the following two implementations.

The first implementation of the step S24 includes the following step D11.

Step D11: inputting the target action and the vehicle state into a danger predicting model that is pre-constructed, to obtain the dangerous situation outputted by the danger predicting model.

As an example, the danger predicting model is obtained by training a machine-learning model by using sample target actions corresponding to sample objects and sample vehicle states as the input and using marked dangerous situations corresponding to the sample objects as the training target.

It can be understood that the sample target actions of the sample objects and the marked dangerous situations corresponding to the sample vehicle states are already known, and thus can be used for the training to obtain the danger predicting model.

As an example, the process of training the danger predicting model involves at least one of the techniques in machine learning such as artificial neural network, belief network, reinforcement learning, transfer learning, inductive learning and style teaching learning.

As an example, the danger predicting model may be any one of a neural network model, a logistic regression model, a linear regression model, Support Vector Machine (SVM), Adaboost, XGboost and the Transformer-Encoder model.

As an example, the danger predicting model may be any one of a model based on recurrent neural network, a model based on convolutional neural network and a classification model based on Transformer-encoder.

The second implementation of the step S24 includes the following steps D21 to D22.

Step D21: obtaining a target region where the target object is located when the target object is executing the target action.

Step D22: when at least local region of the target region is not located within a safe region that is predetermined, based on the vehicle state of the vehicle and a dangerous region where the at least local region is belonged, determining the dangerous situation of the target object at the future moment.

In an optional embodiment, the step D21 has various implementations, and the embodiments of the present application provide, without limitation, the following two implementations.

The first implementation of the step D21 includes the following steps D210 to D214.

Step D210: obtaining an age of the target object.

The process of obtaining the age of the target object may be referred to the above-described process of age determination involved in the process of determining the target object based on the age, and is not discussed further herein.

Step D211: from a predetermined corresponding relation between ages and body-height thresholds, looking up a target body-height threshold of the target object corresponding to an age.

As an example, the standard body heights of different ages are different, and the corresponding relation between the ages and the body-height thresholds may be obtained based on the standard body heights corresponding to the ages.

Step D212: based on the target body-height threshold and the human-body gestures of the target object, obtaining contours of body parts of the target object.

As an example, the lengths of the body parts of the target object may be estimated based on the target body-height threshold, for example, the length of the trunk, the lengths of the legs and the lengths of the arms.

As an example, a target body-weight threshold of the target object corresponding to an age may be looked up from a predetermined corresponding relation between ages and body-weight thresholds.

As an example, the widths of the body parts of the target object may be estimated based on the target body-weight threshold.

As an example, the body parts include but are not limited to the head, the left arm, the right arm, the left leg, the right leg, the left foot, the right foot, the left hand and the right hand. As an example, the contour of the body part may be the largest contour.

As an example, the contour of the body part contains the articulation points located at the body part.

As an example, the body part where the head articulation point is belonged is the head. The body part where the neck articulation point is belonged is the neck. The body part where the left-shoulder articulation point, the left-elbow articulation point and the left-wrist articulation point are belonged is the left arm. The body part where the left-palm articulation point is belonged is the left hand. The body part where the right-shoulder articulation point, the right-elbow articulation point and the right-wrist articulation point are belonged is the right arm. The body part where the right-palm articulation point is belonged is the right hand. The body part where the left-hip articulation point, the left-knee articulation point and the left-ankle articulation point are belonged is the left leg. The body part where the right-hip articulation point, the right-knee articulation point and the right-ankle articulation point are belonged is the right leg. The body part where the left-tiptoe articulation point is belonged is the left foot. The body part where the right-tiptoe articulation point is belonged is the right foot.

As an example, the implementation of the step D212 specifically includes the following steps D2121 to D2122.

Step D2121: based on the target body-height threshold, determining the lengths of the body parts of the target object, to obtain the region blocks corresponding to the body parts.

It can be understood that each of the region blocks has two numerical values, the length and the width. As an example, the widths of the body parts may be determined based on the target body-weight threshold, to obtain the widths of the region blocks.

As an example, the lengths and the widths of the region blocks corresponding to the body parts may be determined merely based on the target body-height threshold.

Step D2122: based on the body parts where the articulation points in the human-body gesture of the target object are belonged, regarding each of the body parts, placing the region block of the corresponding length of the body part into the human-body gesture, wherein the region block contains the articulation points located at the body part, and the region block is the contour of the body part.

As an example, in the process of placing the region blocks, the region blocks of the body parts may be placed by using the neck articulation point as the origin.

Figure 4:
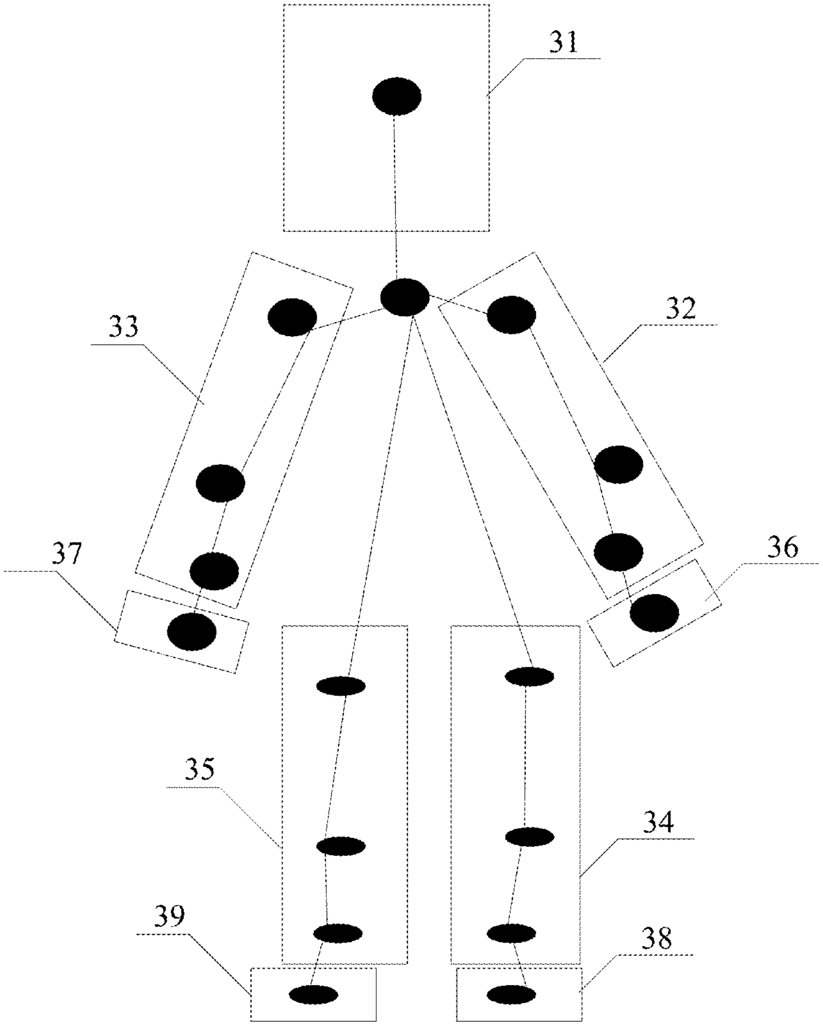
FIG. 4 is a schematic diagram of the placement of region blocks in a human-body gesture according to an embodiment of the present application.

As shown in FIG. 4, FIG. 4 is a schematic diagram of the placement of region blocks in a human-body gesture according to an embodiment of the present application.

Still taking FIG. 3 as an example, the region blocks of the head, the left arm, the right arm, the left leg, the right leg, the left hand, the right hand, the left foot and the right foot are the region block 31, the region block 32, the region block 33, the region block 34, the region block 35, the region block 36, the region block 37, the region block 38 and the region block 39 respectively.

FIG. 4 is illustrated by taking the case as an example in which the region blocks are rectangles. As an example, the shapes of the region blocks may also be polygons, and the shapes of the region blocks of different body parts may be different.

Step D213: determining a target body part executing the target action of the target object.

For example, when the target action is an action of touching and pressing a car-window opening press key, then the executing target body part is the left hand or the right hand. When the target action is an action of pulling a car-door handle, then the executing target body part is the left hand or the right hand. When the target action is an action of placing a foot into a car-door gap, then the executing target body part is the left foot or the right foot. When the target action is an action of sliding down from a safety seat, then the executing target body part is the left foot and/or the right foot. When the target action is an action of untieing a safety belt, then the executing target body part is the left foot or the right foot.

Step D214: based on a position information of a contour of the target body part at a current time, determining the target region where the contour of the target body part is located when the target body part is executing the target action.

Figure 5:
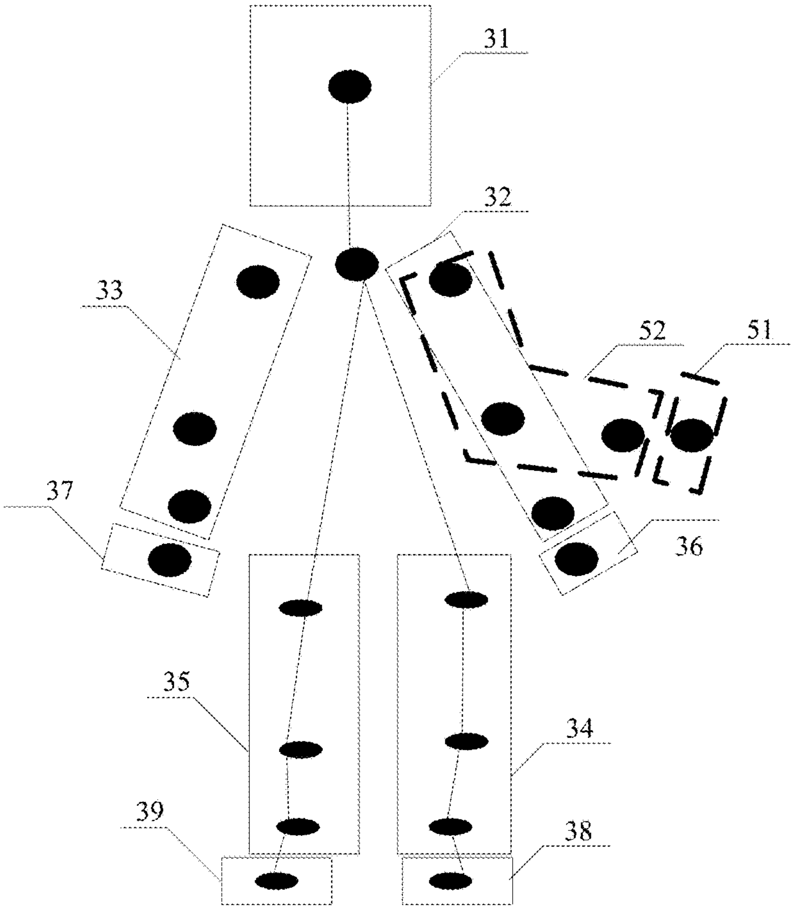
FIG. 5 is a schematic diagram simulating a target region where a contour of a target body part is located when the target body part is executing a target action according to an embodiment of the present application.

As shown in FIG. 5, FIG. 5 is a schematic diagram simulating a target region where the contour of a target body part is located when the target body part is executing a target action according to an embodiment of the present application.

Still taking FIG. 4 as an example, assuming that the action of the target object is an action of pulling a car-door handle, then the process of the target body part executing the target action can be simulated in advance. Assuming that the target body part is the left hand, in FIG. 5 the solid-line block 32 represents the position of the left arm at the current time, and the solid-line block 36 represents the position of the left hand at the current time. In FIG. 5, the dotted-line block 51 represents the contour of the left hand when the left hand is executing the action of pulling the car-door handle, and the dotted-line block 52 represents the contour of the left arm when the left hand is executing the action of pulling the car-door handle. Accordingly, the target region can be determined.

The second implementation of the step D21 includes the following steps D221 to D223.

Step D221: determining a target body part executing the target action of the target object.

Step D222: obtaining, when the target body part of same-age objects whose ages are the same as the age of the target object is executing the target action, candidate regions where the target body part is located.

Step D223: based on the candidate regions corresponding to the target body part of the same-age objects, determining the target region where the target body part of the target object is located.

As an example, the largest candidate region among the candidate regions corresponding to the target body part of the same-age objects may be used as the target region.

As an example, the smallest region containing the candidate regions corresponding to the target body part of the same-age objects may be determined to be the target region.

In an optional embodiment, the safe region and the dangerous region are pre-established. It can be understood that, in a vehicle, the region where a car-door gap is located, the region where a car-window opening press key is located, the region where a car-door handle is located and the region where a safety seat is located are usually fixed and unchanged. Therefore, the dangerous region and the safe region can be predetermined. For example, the region where a car-door gap is located is a dangerous region, the region where a car-window opening press key is located is a dangerous region, and the region where a car-door handle is located is a dangerous region. When a child is correctly sitting in a safety seat, the region where the child is located is a safe region.

In an optional embodiment, the safe region includes a first safe region and/or a second safe region, and the safe region is determined by: from a predetermined corresponding relation between ages and body-height thresholds, looking up a target body-height threshold corresponding to an age of the target object; and when the target object is sitting in a safety seat, determining, when an object having the target body-height threshold is correctly sitting in the safety seat, a region where the object is located to be the first safe region; and/or when the target object is not sitting in a safety seat, determining a region other than a predetermined dangerous region to be the second safe region, wherein the dangerous region includes at least one of a region where a door handle is located, a region where a car-window opening press key is located and a region where a car-door gap is located.

As an example, the safe regions in different situations may be completely different. As an example, the safe regions in different situations may be not completely the same (in other words, part of the regions overlap).

As an example, the first safe region does not contain a dangerous region.

The above-described first safe region and second safe region are merely examples, and do not limit the quantity and the areas of the safe regions according to the embodiments of the present application.

In an optional embodiment, a coordinate system may be established based on a certain articulation point (for example, the neck articulation point) of the target object as the origin, so as to obtain the relative position relation between the target region and the safe region.

In an optional embodiment, based on the position of the target body part of the target object at the current time, the target region where the target body part is located at a future time is determined; and whether the target region and the dangerous region have a coinciding part is determined.

As an example, the vehicle state includes but is not limited to the vehicle speed, and whether the vehicle is in the travelling state.

It can be understood that, at different vehicle states, the results of the determination on whether it is a dangerous situation are different. For example, when the vehicle is in the parking state, when the target object gets off from a safety seat, that should not be a dangerous situation. When the vehicle is in the travelling state, when the target object gets off from a safety seat, that is a dangerous situation. As another example, when the vehicle is in the parking state, when the target object places a hand within the region where a car-window opening press key is located, that is not a dangerous situation. When the vehicle is in the travelling state, and is having a high vehicle speed (for example, in an expressway), when the target object places a hand within the region where a car-window opening press key is located, that is a dangerous situation.

In an optional embodiment, the step D22 involves various cases, and the embodiments of the present application provide, without limitation, the following four cases.

The first case: when the vehicle state is a travelling state, the target object is sitting in a safety seat and the dangerous region is a region other than the first safe region, determining that the dangerous situation is that the target object disengages from the safety seat.

The second case: when the vehicle state is a travelling state, a child safety lock is not turned on and the dangerous region is the region where the door handle is located, determining that the dangerous situation is that the child safety lock is not turned on.

The third case: when the vehicle state is a stationary state and the dangerous region is the region where the car-door gap is located, determining that the dangerous situation is that the target object is about to be squeezed by a car door.

It can be understood that, when the vehicle state is the travelling state, the car doors are always closed, and therefore the probability that the target object is squeezed by a car door is nearly zero.

The fourth case: when the vehicle state is that a vehicle speed is greater than a preset value and the dangerous region is the region where the car-window opening press key is located, determining that the dangerous situation is that the target object is about to open a car window.

As an example, the preset value may be a speed per hour of 100 km. In other words, it is determined whether the vehicle is travelling in an expressway. It can be understood that, when the vehicle is travelling in an expressway or the vehicle speed of the vehicle is excessively high, opening a car window is a very dangerous behavior. When the vehicle is not travelling in an expressway or the vehicle speed is low, opening a car window is not a dangerous behavior.

In an optional embodiment, the dangerous regions where the at least local region is belonged are different, and the dangerous situations of the target object at a future moment are different.

In an optional embodiment, the target object might emit a voice, for example, "I want to open the car window" or "I want to get off from the safety seat". Therefore, the target action of the target object at a future moment may be predicted by referring to the voice emitted by the target object and the action trajectory. The specific method includes the following steps E1 to E2.

Step E1: obtaining text information of the target object corresponding to voice information.

In an optional embodiment, because the position of the target object in the vehicle can be identified, the voice emitted by the target object is collected by using a microphone A in the vehicle adjacent to the target object, and the voice collected by the microphone A is used as the voice of the target object.

In an optional embodiment, because sounds emitted by children are different from sounds emitted by adults, it may be identified, based on the sound characteristics, which voice is the voice of the target object.

In an optional embodiment, the conversion from the voice information into the text information has various implementations, and the embodiments of the present application provide, without limitation, the following two implementations.

The first implementation of the conversion from the voice information into the text information includes the step of converting the voice information into the text information by using a voice-to-text conversion technique.

The second implementation of the conversion from the voice information into the text information includes the following method.

A voice identification system usually includes two parts, an acoustic model (AM) and a language model (LM). The acoustic model is a model that counts up the probability distribution of the voice features versus the phoneme units. The language model is a model that counts up the probability that a word sequence (word context) appears. The voice identification process includes, according to the weighted sum of the probability scores of the two models, obtaining the result of the highest score.

As an example, based on a voice activity detection (VAD) technique, frame splitting processing to the voice information may also be performed, to obtain a plurality of to-be-detected sound frames, simultaneously the acoustic features of the to-be-detected sound frames are obtained, and the acoustic features of the to-be-detected sound frames are sequentially input into a voice activity detection (VAD) model, wherein the VAD model is configured for outputting the probabilities that the to-be-detected sound frames are classified into initial consonants, vowels and noise, determining the first sound frame that is classified as a voice frame to be the starting point of a voice section, and determining the last sound frame that is classified as a voice frame to be the end point of the voice section; the voice section is obtained from the voice information, and the voice section is input into the voice identification system; and the voice section is converted into the text information by using the voice identification system.

Step E2: based on the text information and the action trajectory, predicting the target action of the target object at the future moment.

As an example, based on the action trajectory, a target action of the target object at a future moment is predicted; and subsequently, by using the text information, whether it is the target action is further determined.

For example, when the target action is an action of pulling a car-door handle, and the text information is "I want to open the door", then it is determined that the target action is an action of pulling a car-door handle. When the target action is an action of pulling a car-door handle, and the text information is "I want to open the car window", then it can be determined that the target action is an action of opening a car window.

In the embodiments of the present application, by using the text information to assist in predicting the target action of the target object at a future moment, the obtained target action is more accurate.

In an optional embodiment, the step S25 has various implementations, and the embodiments of the present application provide, without limitation, the following three implementations.

The first implementation of the step S25 includes the following step F11.

Step F11: executing a control strategy corresponding to the dangerous situation.

The second implementation of the step S25 includes the following steps F21 to F22.

Step F21: obtaining text information of the target object corresponding to voice information.

Step F22: executing a control strategy corresponding to the text information and the dangerous situation.

The third implementation of the step S25 includes the following steps F31 to F32.

Step F31: obtaining text information of the target object corresponding to voice information.

Step F32: executing a control strategy of the target object corresponding to an age, the text and the dangerous situation.

In an optional embodiment, the control strategy includes but is not limited to a prompting message.

As an example, the prompting message includes but is not limited to a voice prompting or a special-sound early-warning notice.

It can be understood that an object in the vehicle other than the target object (referred to as the guardian), after the prompting message is received, may pacify the target object, so as to prevent the target object from executing the target action, to prevent a danger.

In an optional embodiment, the control strategy further includes: detecting whether an article that the target object is interested in is contained in the vehicle, and if yes, then prompting the target object to view the article or prompting the guardian to pacify the target object by using the article. The target object might be drawn attention when viewing the article, so that the emotion of the target object is pacified, so as to prevent the target object from executing the target action, thereby a danger is prevented from happening.

As an example, the likes of the target object may be analyzed based on an AI (Artificial Intelligence) algorithm, to analyze out the article that the target object is interested in.

Artificial intelligence refers to theories, methods, techniques and application systems that use digital computers or machines controlled by digital computers to simulate, extend and expand the human intelligence, to sense the environment, obtain knowledge and use the knowledge to obtain the optimum result. In other words, artificial intelligence is a comprehensive technology of the computer science, and it attempts to know the substance of intelligence, and generate a new intelligent machine that can react in the modes similar to those of the human intelligence. Artificial intelligence also refers to studying the design principles and the implementation methods of various types of intelligent machines, to cause the machines to have the functions of sensing, reasoning and decision making.

The technology of artificial intelligence is a synthetic discipline, and involves extensive fields, including the techniques at the hardware level and the techniques at the software level. The basic technologies of artificial intelligence generally include sensors, dedicated artificial-intelligence chips, cloud computing, distributed storage, big-data processing techniques, operation/interaction systems, mechanical-electrical integration and so on. The software technologies of artificial intelligence mainly include a computer vision technology, a voice processing technology, a natural language processing technology and machine learning/deep learning technology as the major fields.

As an example, the article may be a toy or a terminal device. When the article is a terminal device, the terminal device may be controlled automatically to play a program that the target object is interested in.

In an optional embodiment, the control strategy further includes an intelligent guiding voice. The intelligent guiding voice is used to guide the target object not to execute the target action, for example, prompting the target object to leave the dangerous region.

In an optional embodiment, the control strategy further includes at least one of controlling a car window to close, controlling the vehicle speed to decrease, opening a children lock and controlling the terminal device to play a multimedia.

It can be understood that the specific contents of the prompting messages corresponding to different dangerous situations are different. For example, when the dangerous situation is that the target object disengages from a safety seat, then the prompting message is used to prompt the guardian that the target object is about to disengage from the safety seat. When the dangerous situation is that a child safety lock is not turned on, then the prompting message is used to prompt the guardian to turn on the child safety lock. When the dangerous situation is that the target object is about to be squeezed by a car door, then the prompting message is used to prompt the guardian that the target object is about to be squeezed by the car door. When the dangerous situation is that the target object is about to open a car window, then the prompting message is used to prompt the guardian that the target object is about to open the car window.

In an optional embodiment, the text information in the step F22 might contain a cry-or-scream sound of the target object, for example, "I must open the car window, wuwu". The danger class of the dangerous situation may be determined based on the text information. When the danger class is higher, the tone of the voice prompting message is more urgent, and/or the early-warning sound is louder or more frequent.

In an optional embodiment, in the step F32, when the terminal is controlled to play the multimedia, it may play a multimedia matching with the age of the target object.

It can be understood that the growth of children has four stages, namely, 0-1 year as the infancy, 1-4 years as the toddler period, 4-7 years as the preschool period and 7-12 years as the pueritia, and the physical and mental developments of the periods have different demands. A multimedia matching with the age of the target object may be played based on the demand of the child.

The method has been described in detail in the embodiments of the present application stated above. The method according to the present application may be implemented by using apparatuses in various forms. Therefore, the present application further discloses an apparatus, which will be described in detail in the specific embodiments below.

Figure 6:
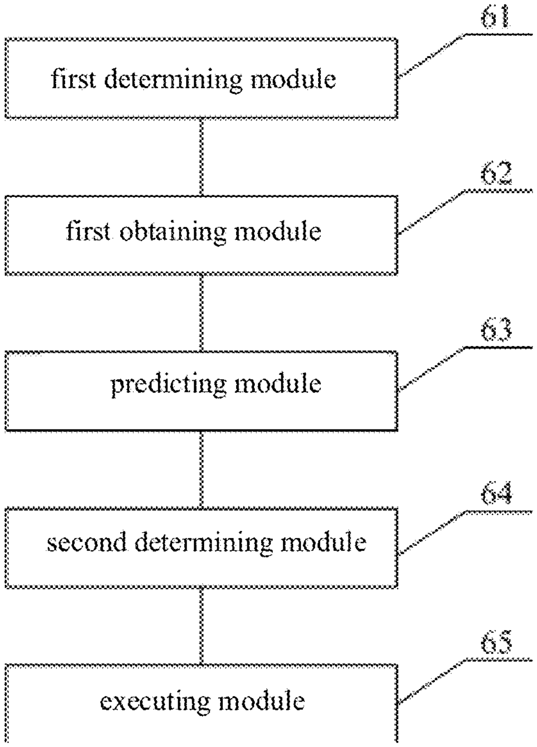
FIG. 6 is a structural diagram of an apparatus for controlling vehicle-riding safety according to an embodiment of the present application.

As shown in FIG. 6, FIG. 6 is a structural diagram of an apparatus for controlling vehicle-riding safety according to an embodiment of the present application. The apparatus includes a first determining module 61, a first obtaining module 62, a predicting module 63, a second determining module 64 and an executing module 65, wherein:

- the first determining module 61 is configured for determining a target object from objects that ride in a vehicle;
- the first obtaining module 62 is configured for obtaining an action trajectory of the target object;
- the predicting module 63 is configured for, based on the action trajectory, predicting a target action of the target object at a future moment;
- the second determining module 64 is configured for, based on the target action and a vehicle state of the vehicle, determining a dangerous situation of the target object at the future moment; and
- the executing module 65 is configured for executing a control strategy corresponding to the dangerous situation, wherein the control strategy includes at least a prompting message, and the prompting message is for prompting other objects than the target object that ride in the vehicle that the target object is about to be in danger.

In an optional embodiment, the second determining module includes:

- a first obtaining unit configured for obtaining a target region where the target object is located when the target object is executing the target action; and
- a first determining unit configured for, when at least local region of the target region is not located within a safe region that is predetermined, based on the vehicle state of the vehicle and a dangerous region where the at least local region is belonged, determining the dangerous situation of the target object at the future moment.

In an optional embodiment, the first obtaining module includes:

- a second obtaining unit configured for obtaining a video containing the target object;
- a third obtaining unit configured for obtaining human-body gestures of the target object in each frame image contained in the video, wherein each of the human-body gestures is formed by a plurality of articulation points; and
- a second determining unit configured for, based on a variation trend of position information of same articulation points in the human-body gestures corresponding to the each frame image, determining the action trajectory of the target object.

In an optional embodiment, the second obtaining module includes:

a fourth obtaining unit configured for obtaining an age of the target object;

a looking-up unit configured for, from a predetermined corresponding relation between ages and body-height thresholds, looking up a target body-height threshold of the target object corresponding to an age;

a fifth obtaining unit configured for, based on the target body-height threshold and the human-body gestures of the target object, obtaining contours of body parts of the target object;

a third determining unit configured for determining a target body part executing the target action of the target object; and a fourth determining unit configured for, based on position information of a contour of the target body part at a current time, determining the target region where the contour of the target body part is located when the target body part is executing the target action.

In an optional embodiment, the predicting module includes:

a sixth obtaining unit configured for obtaining text information of the target object corresponding to voice information; and a predicting unit configured for, based on the text information and the action trajectory, predicting the target action of the target object at the future moment.

In an optional embodiment, the safe region includes a first safe region and/or a second safe region, and the apparatus further includes:

a looking-up module configured for, from a predetermined corresponding relation between ages and body-height thresholds, looking up a target body-height threshold corresponding to an age of the target object; a third determining module configured for, when the target object is sitting in a safety seat, determining, when an object having the target body-height threshold is correctly sitting in the safety seat, a region where the object is located to be the first safe region; and/or a fourth determining module configured for, when the target object is not sitting in the safety seat, determining a region other than a predetermined dangerous region to be the second safe region, wherein the dangerous region includes at least one of a region where a door handle is located, a region where a car-window opening press key is located and a region where a car-door gap is located.

In an optional embodiment, the second determining module includes:

a fifth determining unit configured for, when the vehicle state is a travelling state, the target object is sitting in the safety seat and the dangerous region is a region other than the first safe region, determining that the dangerous situation is that the target object disengages from the safety seat;

a sixth determining unit configured for, when the vehicle state is the travelling state, a child safety lock is not turned on and the dangerous region is a region where the door handle is located, determining that the dangerous situation is that the child safety lock is not turned on;

a seventh determining unit configured for, when the vehicle state is a stationary state and the dangerous region is a region where the car-door gap is located, determining that the dangerous situation is that the target object is about to be squeezed by a car door; and an eighth determining unit configured for, when the vehicle state is that a vehicle speed is greater than a preset value and the dangerous region is a region where the car-window opening press key is located, determining that the dangerous situation is that the target object is about to open a car window.

The specific modes of the operations performed by the modules of the apparatus according to the above embodiments have already been described in detail in the embodiments of the method, and will not be explained and described in detail herein.

Figure 7:
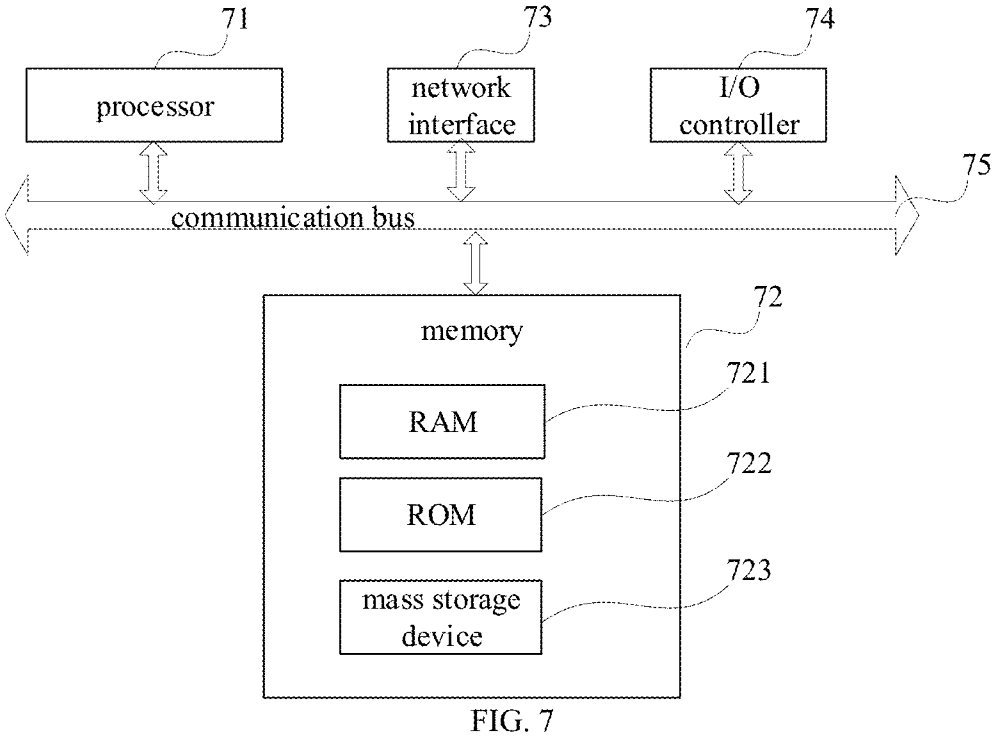
FIG. 7 is a block diagram of an apparatus configured for an electronic device according to an illustrative embodiment of the present application.

FIG. 7 is a block diagram of an apparatus for an electronic device according to an illustrative embodiment.

The electronic device includes but is not limited to a processor 71, a memory 72, a network interface 73, an I/O controller 74 and a communication bus 75.

It should be noted that a person skilled in the art can understand that the structure of the electronic device shown in FIG. 7 does not limit the electronic device, and the electronic device may include components more or fewer than those shown in FIG. 7 or a combination of some of the components, or has a different arrangement of the components.

The component parts of the electronic device will be described specific below with reference to FIG. 7:

The processor 71 is the controlling center of the electronic device, is connected to the parts of the entire electronic device by various interfaces and lines, and, by executing the software programs and/or modules stored in the memory 72, and invoking the data stored in the memory 72, performs the various functions of the electronic device and processes the data, thereby the electronic device is overall monitored. The processor 71 may include one or more processing units. As an example, the processor 71 may be integrated with an application processor and a modulation-demodulation processor, wherein the application processor mainly handles the operating system, the user interface, the application programs and so on, and the modulation-demodulation processor mainly handles the wireless communication. It can be understood that the modulation-demodulation processor may not be integrated into the processor 71.

The processor 71 may be a central processing unit (CPU), or an application specific integrated circuit (ASIC), or one or more integrated circuits configured for implementing the embodiments of the present disclosure, and so on.

The memory 72 might include an internal memory, for example, a high-speed random-access memory (RAM) 721 and a read-only memory (ROM) 722, and may further include a mass storage device 723, for example, at least one magnetic-disk storage and so on. Certainly, the electronic device may further include hardware required by other services.

The memory 72 is configured to store an instruction executable by the processor 71. The processor 71 has the function of implementing the method for controlling the vehicle-riding safety.

A wired or wireless network interface 73 is configured to connect the electronic device to the network.

The processor 71, the memory 72, the network interface 73 and the I/O controller 74 may be interconnected by the communication bus 75. The communication bus may be an ISA (Industry Standard Architecture) bus, a PCI (Peripheral Component Interconnect) bus, an EISA (Extended Industry Standard Architecture) bus and so on. The bus may include an address bus, a data bus, a control bus and so on.

In an illustrative embodiment, the electronic device may be implemented by using one or more application specific integrated circuits (ASIC), digital signal processors (DSP), digital signal processing devices (DSPD), programmable logic devices (PLD), field-programmable gate arrays (FPGA), controllers, microcontrollers, microprocessors or other electronic elements, to implement the method for controlling the vehicle-riding safety.

In an illustrative embodiment, an embodiment of the present application provides a storage medium containing an instruction, for example, the memory 72 containing an instruction, and the instruction is executable by the processor 71 of the electronic device to implement the method. Optionally, the storage medium may be a non-transitory computer-readable storage medium. For example, the non-transitory computer-readable storage medium may be a ROM, a Random Access Memory (RAM), a CD-ROM, a magnetic tape, a floppy disk, an optical data storage device and so on.

In an illustrative embodiment, a computer-readable storage medium is further provided, which may be directly loaded into an internal memory of a computer, for example, the memory 72, and contains a software code, and the computer program, after loaded into and executed by the computer, can implement the steps of any one of the embodiments of the method for controlling the vehicle-riding safety.

In an illustrative embodiment, a computer program product is further provided, which may be directly loaded into an internal memory of a computer, for example, the memory included by the electronic device, and contains a software code, and the computer program, after loaded into and executed by the computer, can implement the steps of any one of the embodiments of the method for controlling the vehicle-riding safety.

It should be noted that the features set forth in the embodiments of the description may be replaced by or combined with each other. Regarding the device or system embodiments, because they are substantially similar to the process embodiments, they are described simply, and the related parts may be referred to the description on the process embodiments.

It should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "including a . . . " does not exclude additional same element in the process, method, article or device including the element.

The steps of the method or algorithm described with reference to the embodiments disclosed herein may be implemented directly by using hardware, a software module executed by a processor or a combination thereof. The software module may be embedded in a Random Access Memory (RAM), an internal memory, a read-only memory (ROM), an electrically programmable ROM, an electrically erasable programmable ROM, a register, a hard disk, a removable disk, a CD-ROM, or a storage medium in any other form well known in the art.

The above description on the disclosed embodiments enables a person skilled in the art to implement or use the present application. Various modifications on those embodiments will be apparent to a person skilled in the art, and the general principle defined herein may be implemented in other embodiments without departing from the spirit or scope of the present application. Therefore, the present application should not be limited to the embodiments illustrated herein, but should meet the broadest scope in accord with the principle and the novel characteristics disclosed herein.

What is claimed is:

1. A method for controlling vehicle-riding safety, comprising:

determining a target object from objects that ride in a vehicle, wherein the target object comprises at least one of a child with a preset age interval from 0 year to 12 years, a person having mental retardation and a disabled person having difficulty in moving;

obtaining an action trajectory of the target object;

based on the action trajectory, predicting a target action of the target object at a future moment;

based on the target action and a vehicle state of the vehicle, determining a dangerous situation of the target object at the future moment; and executing a control strategy corresponding to the dangerous situation, wherein the control strategy comprises at least a prompting message, and the prompting message is for prompting other objects than the target object that ride in the vehicle that the target object is about to be in danger;

wherein the step of, based on the target action and the vehicle state of the vehicle, determining the dangerous situation of the target object at the future moment comprises:

obtaining a target region where the target object is located when the target object executes the target action, and when at least local region of the target region is not located within a safe region that is predetermined, based on the vehicle state of the vehicle and a dangerous region where the at least local region is belonged, determining the dangerous situation of the target object at the future moment;

wherein the step of obtaining the target region where the target object is located when the target object executes the target action comprises:

obtaining an age of the target object; and from a predetermined corresponding relation between ages and body-height thresholds, looking up a target body-height threshold of the target object corresponding to an age;

wherein the control strategy further comprises: detecting whether an article that the target object is interested in is contained in the vehicle, and if yes, then prompting the target object to view the article or prompting a guardian to pacify the target object by using the article.

2. The method for controlling the vehicle-riding safety according to claim 1, wherein the step of obtaining the action trajectory of the target object comprises:

obtaining a video containing the target object;

obtaining human-body gestures of the target object in each frame image contained in the video, wherein each of the human-body gestures is formed by a plurality of articulation points; and based on a variation trend of position information of same articulation points in the human-body gestures corresponding to the each frame image, determining the action trajectory of the target object.

3. The method for controlling the vehicle-riding safety according to claim 1, wherein the step of obtaining the target region where the target object is located when the target object executes the target action further comprises:

based on the target body-height threshold and the human-body gestures of the target object, obtaining contours of body parts of the target object;

determining a target body part executing the target action of the target object; and based on position information of a contour of the target body part at a current time, determining the target region where the contour of the target body part is located when the target body part is executing the target action.

4. The method for controlling the vehicle-riding safety according to claim 1, wherein the step of, based on the action trajectory, predicting the target action of the target object at the future moment comprises:

obtaining text information of the target object corresponding to voice information; and based on the text information and the action trajectory, predicting the target action of the target object at the future moment.

5. The method for controlling the vehicle-riding safety according to claim 1, wherein the safe region comprises a first safe region and/or a second safe region, and the safe region is determined by:

from the predetermined corresponding relation between the ages and the body-height thresholds, looking up the target body-height threshold of the target object corresponding to the age; and when the target object is sitting in a safety seat, determining, when an object having the target body-height threshold is correctly sitting in the safety seat, a region where the object is located to be the first safe region; and/or when the target object is not sitting in the safety seat, determining a region other than a predetermined dangerous region to be the second safe region, wherein the dangerous region comprises at least one of a region where a door handle is located, a region where a car-window opening press key is located and a region where a car-door gap is located.

6. The method for controlling the vehicle-riding safety according to claim 5, wherein the step of, based on the vehicle state of the vehicle and the dangerous region where the at least local region is belonged, determining the dangerous situation of the target object at the future moment comprises:

when the vehicle state is a travelling state, the target object is sitting in the safety seat and the dangerous region is a region other than the first safe region, determining that the dangerous situation is that the target object disengages from the safety seat;

when the vehicle state is the travelling state, a child safety lock is not turned on and the dangerous region is a region where the door handle is located, determining that the dangerous situation is that the child safety lock is not turned on;

when the vehicle state is a stationary state and the dangerous region is a region where the car-door gap is located, determining that the dangerous situation is that the target object is about to be squeezed by a car door; and when the vehicle state is that a vehicle speed is greater than a preset value and the dangerous region is a region where the car-window opening press key is located, determining that the dangerous situation is that the target object is about to open a car window.

7. An electronic device, comprising:

a processor; and a memory configured to store an instruction executable by the processor;

wherein the processor is configured to execute the instruction to implement the method for controlling the vehicle-riding safety according to claim 1.

8. A non-transitory computer-readable storage medium, wherein when an instruction in the non-transitory computer-readable storage medium is executed by a processor of an electronic device, the electronic device is enabled to implement the method for controlling the vehicle-riding safety according to claim 1.

9. The electronic device according to claim 7, wherein the operation of, obtaining the action trajectory of the target object comprises:

obtaining a video containing the target object;

obtaining human-body gestures of the target object in each frame image contained in the video, wherein each of the human-body gestures is formed by a plurality of articulation points; and based on a variation trend of position information of same articulation points in the human-body gestures corresponding to the each frame image, determining the action trajectory of the target object.

10. The electronic device according to claim 7, wherein the operation of, obtaining the target region where the target object is located when the target object executes the target action further comprises:

based on the target body-height threshold and the human-body gestures of the target object, obtaining contours of body parts of the target object;

determining a target body part executing the target action of the target object; and based on position information of a contour of the target body part at a current time, determining the target region where the contour of the target body part is located when the target body part is executing the target action.

11. The electronic device according to claim 7, wherein the operation of, based on the action trajectory, predicting the target action of the target object at the future moment comprises:

obtaining text information of the target object corresponding to voice information; and based on the text information and the action trajectory, predicting the target action of the target object at the future moment.

12. The electronic device according to claim 7, wherein the operation of, the safe region comprises a first safe region and/or a second safe region, and the safe region is determined by:

from the predetermined corresponding relation between the ages and the body-height thresholds, looking up the target body-height threshold of the target object corresponding to the age; and when the target object is sitting in a safety seat, determining, when an object having the target body-height threshold is correctly sitting in the safety seat, a region where the object is located to be the first safe region; and/or when the target object is not sitting in the safety seat, determining a region other than a predetermined dangerous region to be the second safe region, wherein the dangerous region comprises at least one of a region where a door handle is located, a region where a car-window opening press key is located and a region where a car-door gap is located.

13. The electronic device according to claim 12, wherein the operation of, based on the vehicle state of the vehicle and the dangerous region where the at least local region is belonged, determining the dangerous situation of the target object at the future moment comprises:

when the vehicle state is a travelling state, the target object is sitting in the safety seat and the dangerous region is a region other than the first safe region, determining that the dangerous situation is that the target object disengages from the safety seat;

when the vehicle state is the travelling state, a child safety lock is not turned on and the dangerous region is a region where the door handle is located, determining that the dangerous situation is that the child safety lock is not turned on;

when the vehicle state is a stationary state and the dangerous region is a region where the car-door gap is located, determining that the dangerous situation is that the target object is about to be squeezed by a car door; and when the vehicle state is that a vehicle speed is greater than a preset value and the dangerous region is a region where the car-window opening press key is located, determining that the dangerous situation is that the target object is about to open a car window.

14. The non-transitory computer-readable storage medium according to claim 8, wherein the operation of, obtaining the action trajectory of the target object comprises:

obtaining a video containing the target object;

obtaining human-body gestures of the target object in each frame image contained in the video, wherein each of the human-body gestures is formed by a plurality of articulation points; and based on a variation trend of position information of same articulation points in the human-body gestures corresponding to the each frame image, determining the action trajectory of the target object.

15. The method for controlling the vehicle-riding safety according to claim 1, wherein the step of obtaining the action trajectory of the target object comprises:

obtaining videos containing the target object that are collected by cameras in different directions;

obtaining a plurality of frame images contained in the videos; and regarding each of the plurality of frame images, obtaining a two-dimensional coordinate (u,v) in a two-dimensional coordinate system of the target object in the image, and converting the two-dimensional coordinate into a three-dimensional coordinate (X,Y,Z).

16. The method for controlling the vehicle-riding safety according to claim 15, wherein after the step of regarding the each of the plurality of frame images, obtaining the two-dimensional coordinate (u,v) in the two-dimensional coordinate system of the target object in the image, and converting the two-dimensional coordinate into the three-dimensional coordinate (X,Y,Z), the method further comprises:

adding the three-dimensional coordinates of the target object in the images contained in the videos into the three-dimensional coordinate system;

obtaining a plurality of three-dimensional-position sets, wherein each of the three-dimensional-position sets includes the three-dimensional coordinates corresponding to same collection time;

inputting each of the three-dimensional-position sets into a gesture identifying model that is pre-constructed, to obtain human-body gestures corresponding to the three-dimensional coordinates; and regarding any two three-dimensional-position sets whose time is consecutive, connecting corresponding articulation points in the human-body gestures corresponding to the two three-dimensional-position sets, to obtain the action trajectory in the three-dimensional coordinate system.

17. The method for controlling the vehicle-riding safety according to claim 1, wherein after determining the target object from objects that ride in the vehicle, likes of the target object is analyzed based on an artificial intelligence (AI) algorithm, to analyze out the article that the target object is interested in.

* * * * *